(12) United States Patent
Doepfert et al.

(10) Patent No.: US 12,264,725 B2
(45) Date of Patent: Apr. 1, 2025

(54) DEVICE FOR TRANSMITTING TORQUE AND AXIALLY SECURING TWO TORQUE-TRANSMITTING COMPONENTS

(71) Applicant: ZF Friedrichshafen AG, Friedrichshafen (DE)

(72) Inventors: Hagen Doepfert, Lindau (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/505,383

(22) Filed: Nov. 9, 2023

(65) Prior Publication Data
US 2024/0159297 A1    May 16, 2024

(30) Foreign Application Priority Data
Nov. 10, 2022   (DE) .................... 10 2022 211 899.5

(51) Int. Cl.
*F16H 1/28*   (2006.01)
*F16H 57/08*   (2006.01)

(52) U.S. Cl.
CPC ............... *F16H 1/28* (2013.01); *F16H 57/08* (2013.01)

(58) Field of Classification Search
CPC ...... F16H 1/28; F16H 57/08; F16H 2055/176; F16H 57/023
See application file for complete search history.

(56) References Cited

U.S. PATENT DOCUMENTS

| 6,729,199 B2 | 5/2004 | Haupt et al. |
| 10,753,451 B2 | 8/2020 | Schneider |
| 2016/0319886 A1 | 11/2016 | Kleinewegen |
| 2018/0306301 A1 * | 10/2018 | Schneider ............... F16H 57/08 |
| 2020/0332893 A1 * | 10/2020 | Kehr ..................... F16D 63/006 |

FOREIGN PATENT DOCUMENTS

| DE | 19544316 A1 * | 5/1996 | ............... F16D 1/06 |
| DE | 29622017 U1 * | 2/1997 | .......... F16D 1/0864 |
| DE | 19961988 A1 | 7/2001 | |
| DE | 102015219855 A1 | 4/2017 | |
| DE | 102019129724 A1 | 5/2021 | |

OTHER PUBLICATIONS

German Office Action DE 10 2022 211 899.5, dated Jul. 10, 2023. (12 pages).

* cited by examiner

*Primary Examiner* — Stacey A Fluhart
*Assistant Examiner* — Aimee Tran Nguyen
(74) *Attorney, Agent, or Firm* — Dority & Manning, P.A.

(57) ABSTRACT

A device for transmitting torque and axially securing a first torque-transmitting component (1) and a second torque-transmitting component (2) is provided. The first component (1) includes axially projecting first projections (3) distributed over the circumference and have first gaps (4) arranged therebetween. The second component (2) includes radially projecting second projections (5) having second gaps (6) arranged therebetween. Each second projection (5) on the second component (2) protrudes into a respective first gap (4) in the first component (1). At least two of the second projections (5) include a section (8) that projects axially in the direction of the first component (1) and is configured in each case such that, when the device is installed, the section rests axially via an end face (9) against the first component (1).

9 Claims, 1 Drawing Sheet

DEVICE FOR TRANSMITTING TORQUE AND AXIALLY SECURING TWO TORQUE-TRANSMITTING COMPONENTS

CROSS-REFERENCE TO RELATED APPLICATION

The present application is related and has right of priority to German Patent Application No. DE102022211899.5 filed on Nov. 10, 2022, which is incorporated by reference in its entirety for all purposes.

FIELD OF THE INVENTION

The invention relates generally to a device for transmitting torque and axially securing a first torque-transmitting component and a second torque-transmitting component. The invention further relates generally to the use of the aforementioned device in a planetary gear.

BACKGROUND

Planetary gears are known from the prior art, in which a ring gear carrier having fine-blanked toothing engages into a toothing on the ring gear. Previously, said planetary gears had relatively large overall radial heights. In addition, the ring gear carrier previously rested axially annularly against the ring gear, such that a sufficient quantity of oil that may need to be carried away cannot drain. This results in greater drag torques.

DE 10 2015 219 855 A1 describes a ring gear for a planetary gear, the ring gear having a gear ring, which includes an internal toothing on the inner circumferential surface and includes a radially projecting and unilaterally axially overhung flange on the outer circumferential surface. The flange forms a circumferential collar and a collar-shaped overhang, and the collar-shaped overhang is provided with a crown gearing. The crown gearing is continuous and protrudes axially through the collar.

SUMMARY OF THE INVENTION

Example aspects of the present invention provide a device that has improved torque transmission between two torque-transmitting components and is suited, in particular, for use in a planetary gear.

In a device according to example aspects of the invention for transmitting torque and axially securing a first torque-transmitting component and a second torque-transmitting component, the first component includes axially projecting first projections, which are distributed over the circumference and have first gaps arranged therebetween, wherein the second component includes radially projecting second projections, which have second gaps arranged therebetween, wherein a second projection on the second component in each case protrudes into an associated first gap in the first component, wherein at least two of the second projections have a section that projects axially in the direction of the first component and is designed in each case such that, when the device is installed, said section comes to rest axially via an end face against the first component. In other words, projections on and gaps in the first and the second components are alternatingly arranged in the circumferential direction, wherein the projections on the first component engage into gaps in the second component and projections on the second component engage into gaps in the first component.

Since the first projections on the first component project axially, said first projections together with the gaps arranged therebetween form a crown gearing of the first component. The crown gearing is preferably impact milled, fly-cut, or impact turned. Since the second projections on the second component protrude radially, said second projections give the second component the appearance of a gear. In other words, the second projections extend radially outward from the second component in a star shape. The first and the second components mesh with each other via the projections.

The gaps in the first component are designed such that each gap has an axial contact surface, which is designed such that, when the device is installed, said axial contact surface has planar contact with the end face of the axially protruding section, such that the second component rests axially against the first component, and vice versa, and the second component is axially secured against the first component, and vice versa. When the device is installed, the second component is axially spaced apart from the axial contact surfaces in the first gaps in the first component, wherein the second component comes to rest via the end face against the first component and against the associated contact surface exclusively via the sections protruding axially in the direction of the axial contact surfaces.

An axially protruding section is considered to be a section on the second projection, which has a semi-circular shape in the circumferential direction of the second component and extends axially starting from the second component in the direction of the first component. The axially projecting section can be integrally formed on the second projection in the form of an axial projection or a protrusion. Alternatively, the second component can be plastically deformed such that the material on the second projection on the second component is deflected to form the axially protruding section.

Preferably, the first torque-transmitting component and/or the second torque-transmitting component are/is annular. The projections and the gaps are alternatingly arranged on the annular component of the first and the second components over the circumference of the first and the second components. The annular portion of the second component preferably has a smaller outer diameter than the inner diameter of the annular portion of the first component, so that the radially extending second projections can engage from radially inside into the crown gearing of the first component.

It is necessary that at least two second projections have an axially projecting section in order to provide a secure axial support of the first component against the second component, and vice versa. The more second projections an axially projecting section has, the better and more uniform is the support of the two components against each other. According to one exemplary embodiment, more than two second projections each have an axially projecting section. Preferably, each second projection on the second component has an axially projecting section. As a result, a complete and uniform transmission of force between the first component and the second component is achieved. Preferably, the number of first projections on the first component is a prime number. As a result, the production quality can be positively influenced.

Preferably, the second projections are arranged uniformly spaced apart from one another along the circumference of the second component. Correspondingly, the second gaps are also arranged uniformly spaced apart from one another along the circumference of the second component. In addition, the first projections are also uniformly spaced apart from one another along the circumference of the first component in accordance with the second projections and the second gaps. As a result, a more uniform transmission of force between the first component and the second component is also achieved.

According to example aspects of the invention, the second component is a sheet-metal component produced via stamping and reshaping. In this sense, the axially projecting section is formed at a penetration formed on the second component. In other words, the second component is reshaped at the second projections that will have an axially projecting section, such that the axially projecting sections are formed at a penetration, such that a recess is formed in the particular second projection at a side of the second projection that is opposite the axially projecting section, the recess having been formed by a forming tool for producing the axially projecting section. The penetration can therefore be a pot-like formation, which has a blind hole, on the second projection on the second component, wherein the base of the pot-like formation forms the end face of the axially projecting section.

The axially projecting section acts as an axial contact surface which, when the device is installed, comes to rest against the contact surface in the gap in the first component.

The first and the second projections are formed such that the first and the second projections rest against each other in a planar manner in the circumferential direction in the area, in which the first and the second projections intersect. For this purpose, when the second projections have broken or chamfered edges, said second projections can protrude slightly radially over the outer circumference of the first component. When the edges of the second projections are not broken or chamfered, the outer circumference of the second projections can be aligned with the outer circumference of the first component in the area of the first projections in the circumferential direction with respect to a rotation axis of the second component.

Preferably, the second component is at least axially secured against the first component by a securing element. Preferably, the securing element is annular. In particular, the securing element is a snap ring, which is accommodated in a groove in each of the first projections on the first components. Multiple grooves, which are aligned with each other in the circumferential direction, in the first projections, which are spaced apart from each other in the circumferential direction, form a receiver for radially and axially securing the securing element.

Preferably, the tangential width of the axially projecting section of the axially projecting section is less than the tangential width of the first gap in the first component. This yields several advantages. On the one hand, as a result, lubricant for cooling and lubricating the device or other components located in the surroundings of the device can drain better, in particular radially, since there is an open space or a gap at least on one tangential side, preferably on both sides, of the axially projecting section, through which the lubricant can drain. As a result, the lubricant does not accumulate in the first gaps in the first component. On the other hand, it is guaranteed in this way that the second component does not ride on a transition radius of the crown gearing of the first component in the circumferential direction. The tangential width of the axially projecting section on the second component, in particular of the penetration, is therefore selected such that the axially projecting section does not come to rest against the first component at the transition radius of the first gap. As a result, the overall radial height of the connection between the first component and the second component can be greatly reduced. The transition radius is formed between a tangential edge of the first projection and the axial contact surface on the base of the first gap of the crown gearing, each first gap having two transition radii in the two corners.

The device is suited, in particular, for use in a planetary gear having at least one planetary gear set including multiple gear set elements, wherein the first torque-transmitting component is a ring gear of the planetary gear set and the second torque-transmitting component is a ring gear carrier. The ring gear carrier can be part of the planetary gear. Alternatively, the ring gear carrier can be part of a transmission of a drive train accommodating the planetary gear. The ring gear can be connected to an output shaft via the ring gear carrier, enabling drive power to be transmitted between the ring gear and the output shaft via the ring gear carrier. In this sense, the ring gear carrier or the second torque-transmitting component has, in particular radially inward, a mechanism for establishing a corotational connection to a further component, in particular an output shaft of the drive train. Consequently, the ring gear carrier acts, in particular, as a driving part for a corotational connection with a shaft, in particular an output shaft of the drive train, or to a gear.

All comments presented above with respect to the first torque-transmitting component also apply similarly for the ring gear of the at least first planetary gear set of the planetary gear, and all comments presented above with respect to the second torque-transmitting component also apply similarly for the ring gear carrier.

The gear set elements of the at least first planetary gear set are in the form of a sun gear, a planet carrier, and a ring gear. At least one, preferably multiple planet gear(s) is/are rotatably mounted on the planet carrier and is/are meshed with the sun gear and/or the ring gear of the at least first planetary gear set.

The first component or the ring gear preferably has a gear ring, via which the ring gear meshes with at least one planet gear. The ring gear carrier as described above is non-rotatably arranged and axially secured on one axial end or one axial end face of the ring gear.

BRIEF DESCRIPTION OF THE DRAWINGS

An exemplary embodiment of the invention is explained in greater detail in the following with reference to the drawings, wherein identical or similar elements are labeled with the same reference character, wherein.

DETAILED DESCRIPTION

Figure 1:
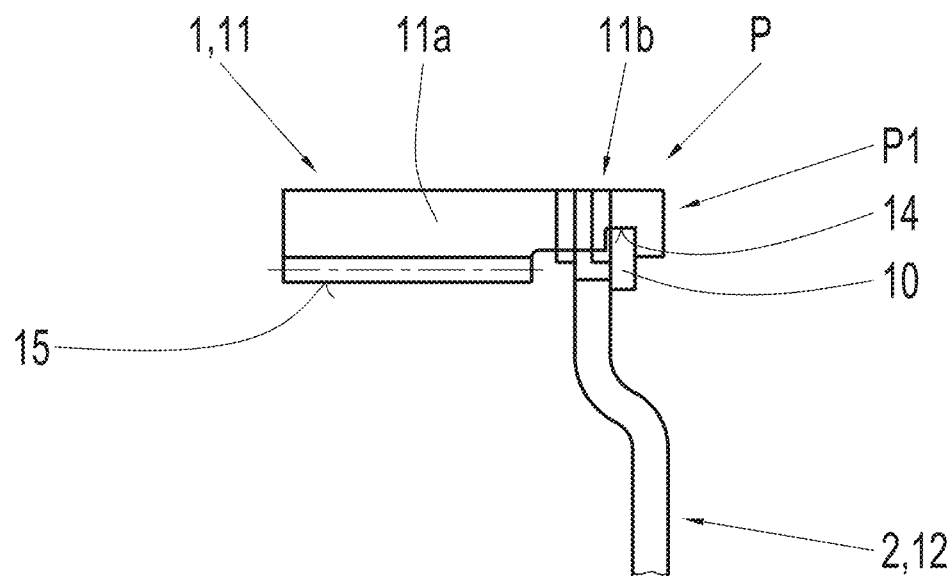
FIG. 1 shows a schematic partial longitudinal sectional view of a device according to example aspects of the invention for transmitting torque and axially securing a first torque-transmitting component and a second torque-transmitting component.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
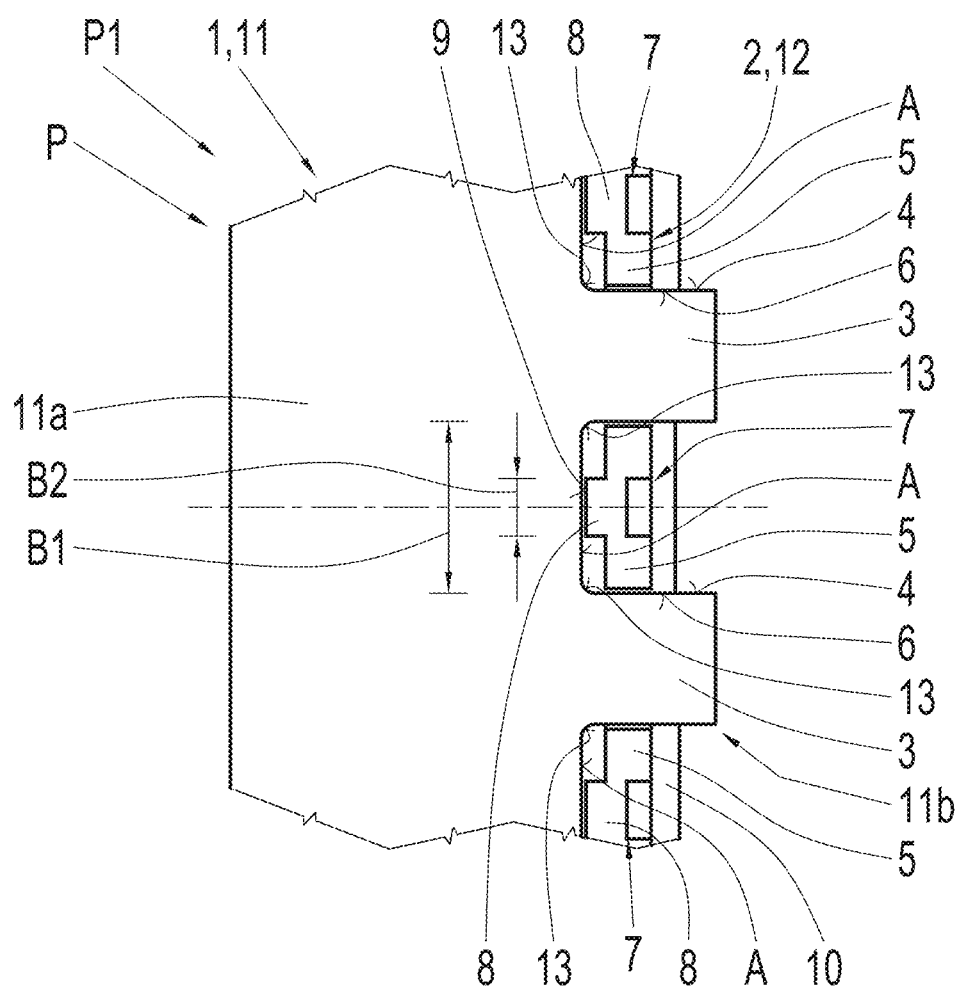
FIG. 2 shows a schematic side view of the device according to example aspects of the invention, according to FIG. 1.

FIG. 1 and FIG. 2 show a device according to example aspects of the invention for transmitting torque and axially securing a first torque-transmitting component 1 and a second torque-transmitting component 2, in the partial longitudinal sectional view in FIG. 1 and in the side view in FIG. 2. In the present case, the device is part of a planetary gear P, which has a planetary gear set P1 including multiple gear set elements, wherein the only gear set element shown in the present case is the ring gear 11 of the planetary gear set P1. The ring gear 11 of the planetary gear set P1 is the first torque-transmitting component 1, wherein a ring gear carrier 12 fixed thereto for conjoint rotation is considered to be the second torque-transmitting component 2 of the device according to example aspects of the invention. The ring gear 11 can be the output element or one of the output elements of the planetary gear P, wherein the drive power can be transmitted via the ring gear 11 and the ring gear carrier 12, which is fixed thereto for conjoint rotation, onto a further component or gear (not shown here).

The ring gear 11 is annular, being designed in the shape of a sleeve in the present case, and includes a gear ring 11a having an inner toothing 15. Axially projecting first projections 3, which are uniformly distributed across the circumference and have first gaps 4 arranged therebetween, are arranged on the axial end of the gear ring 11a. Consequently, the gear ring 11a has a crown gearing 11b, which can be impact milled, fly-cut, or impact turned.

The ring gear carrier 12 is also annular, being annular-disk-shaped in the present case, and has radially projecting second projections 5, which are uniformly distributed across the circumference and have second gaps 6 arranged therebetween. Consequently, the cross section of the ring gear carrier 12 has the shape of a gear. A second projection 5 on the second component 2 in each case protrudes into an associated first gap 4 in the first component 1, while a first projection 3 on the crown gearing 11b of the ring gear 11 in each case protrudes into an associated second gap 6. The crown gearing 11b is meshed with the ring gear carrier 12. The ring gear carrier 12 is a sheet-metal component produced via stamping and reshaping, wherein a penetration 7 is formed on every second projection 5. The penetration 7 is designed such that an axially projecting section 8 is formed on one side of all second projections 5 on the ring gear carrier 12, in the direction of the ring gear 11 in this case. When the planetary gear P or the device is installed, the axially projecting section 8 comes to rest against a contact surface A in the first gap 4 of the ring gear 11. In other words, the axially projecting section 8 is formed at a penetration 7, which is formed on the ring gear carrier 12.

Consequently, every axially projecting section 8 is designed such that, when the device is installed, the axially projecting section 8 comes to rest axially via an end face 9 against the first component 1, specifically against the contact surface A in this case. The projections 3, 5 and the gaps 4, 6 arranged therebetween, respectively, are uniformly distributed and alternatingly arranged along the circumference of the device. A first projection 3 and a second gap 6 follow a second projection 5 and a first gap 4 in each case, and vice versa, in the circumferential direction.

The tangential width B2 of the penetration 7 having the axially projecting section 8 is less than the tangential width B1 of the first gap 4 in the ring gear 11. As a result, it is ensured that the ring gear carrier 12 does not ride via the projections 5 on transition radii 13 of the crown gearing 11b. In addition, lubricant can drain better.

The ring gear carrier 12 is radially and axially secured on the ring gear 11 by a securing element 10, which is formed as a snap ring. The securing element 10 is accommodated axially and radially, i.e., in a substantially form-locking manner, by a groove 14 in each of all first projections 3.

The invention is not limited to the disclosed example embodiments. Other embodiments or variations result for a person skilled in the art within the scope of the utilization of the present invention and within the scope of a precise analysis of the drawings, the description and the patent claims. It is conceivable that the planetary gear P has at least one second planetary gear set and also has, as the gear set elements, a second sun gear, a second ring gear and multiple planet gears, which are guided on a circular path around the second sun gear by a second planet carrier. It is also conceivable that the planetary gear P is an integrated differential having two planetary gear sets.

An integrated differential is considered to be a differential that includes a first planetary gear set and a second planetary gear set, wherein the first planetary gear set is drivingly connected, for example, to an input shaft, to the second planetary gear set and to a first output shaft. The second planetary gear set is drivingly connected to a second output shaft. By such an integrated differential, the input torque at the input shaft is convertable and is distributable and transmissible onto the two output shafts in a defined ratio. Preferably, fifty percent (50%), i.e., one half, of the input torque is transmitted onto each of the output shafts. Therefore, the differential does not have a rotating component, to which the sum of the two output torques is applied. In other words, a cumulative torque is prevented from arising. In addition, the differential does not have toothings that revolve as a unit or that revolve without a rolling motion when the output speeds of the output shafts are identical. Consequently, there is always a relative motion of the components of the differential that mesh with one another, regardless of the output speeds of the output shafts. The output shafts of the differential are designed, in particular, to be at least indirectly connected to a wheel of the motor vehicle.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 first torque-transmitting component
2 second torque-transmitting component
3 first projection
4 first gap
5 second projection
6 second gap
7 penetration
8 axially projecting section
9 end face
10 securing element
11 ring gear
11a gear ring
11b crown gearing 12 ring gear carrier
13 transition radius
14 groove
15 internal toothing
A contact surface
B1 tangential width of the first gap
B2 tangential width of the axially projecting section
P planetary gear
P1 planetary gear set

The invention claimed is:

1. A device for transmitting torque and axially securing torque-transmitting components for use in a planetary gear (P) having a planetary gear set (P1), comprising:
  a first torque-transmitting component (1) comprising a plurality of axially projecting first projections (3) distributed over a circumference of the first torque-transmitting component (1) and with first gaps (4) arranged therebetween, the first torque-transmitting component (1) being a ring gear (11) of the planetary gear set (P1); and
  a second torque-transmitting component (2) comprising a plurality of radially projecting second projections (5) with second gaps (6) arranged therebetween, the second torque-transmitting component (2) being a ring gear carrier (12) of the planetary gear set (P1),
  wherein each second projection (5) on the second component (2) protrudes into a respective first gap (4) in the first component (1), and
  wherein at least two of the second projections (5) comprise a section (8) that projects axially towards the first component (1) and is configured such that, when the device is installed, the section (8) rests axially against the first component (1) via an end face (9) of the section (8).

2. The device of claim 1, wherein one or both of the first torque-transmitting component (1) and the second torque-transmitting component (2) is annular.

3. The device of claim 1, wherein each of the second projections (5) comprises the section (8) that projects axially towards the first component (1).

4. The device of claim 1, wherein the second projections (5) are uniformly spaced apart from one another along a circumference of the second component (2).

5. The device of claim 1, wherein the second component (2) is a sheet-metal component produced via stamping and reshaping.

6. The device of claim 1, wherein the section (8) is formed at a penetration (7) on the second component (2).

7. The device of claim 1, wherein the second component (2) is axially secured against the first component (1) by a securing element (10).

8. The device of claim 1, wherein a tangential width (B2) of the section (8) is less than a tangential width (B1) of the first gaps (4) in the first component (1).

9. A planetary gear (P), comprising:
  at least one planetary gear set, the at least one planetary gear set including the planetary gear set (P1) having the device of claim 1.

* * * * *